United States Patent [19]
Myers

[11] Patent Number: 6,112,511
[45] Date of Patent: Sep. 5, 2000

[54] METHOD AND APPARATUS FOR WATER INJECTION VIA PRIMARY JETS

[75] Inventor: Geoffrey D. Myers, Goodyear, Ariz.

[73] Assignee: AlliedSignal, Inc., Morris Township, N.J.

[21] Appl. No.: 09/138,192

[22] Filed: Aug. 21, 1998

Related U.S. Application Data

[60] Provisional application No. 60/057,362, Aug. 29, 1997.

[51] Int. Cl.[7] ........................................ F02C 7/00
[52] U.S. Cl. ............................. 60/39.55; 60/748
[58] Field of Search ................. 60/39.05, 39.55, 60/748, 39.32

[56] References Cited

U.S. PATENT DOCUMENTS

| | | |
|---|---|---|
| 2,847,825 | 8/1958 | Spears . |
| 3,785,146 | 1/1974 | Bailey et al. . |
| 4,338,780 | 7/1982 | Sakamoto et al. . |
| 4,377,067 | 3/1983 | Sternfield et al. . |
| 4,712,370 | 12/1987 | MacGee .................. 60/39.07 |
| 5,274,995 | 1/1994 | Horner et al. . |
| 5,355,670 | 10/1994 | Sciocchetti . |
| 5,459,995 | 10/1995 | Norton et al. ........................ 60/39.31 |
| 5,816,041 | 10/1998 | Greninger .............................. 60/39.05 |

FOREIGN PATENT DOCUMENTS

| | | |
|---|---|---|
| 52-39007 | 9/1977 | Japan ................................... 60/39.55 |
| 644719 | 5/1948 | United Kingdom . |

*Primary Examiner*—Timothy S. Thorpe
*Assistant Examiner*—Ehud Gartenberg
*Attorney, Agent, or Firm*—Robert Desmond, Esq.

[57] ABSTRACT

An apparatus is disclosed for injecting fluid coolant into a gas turbine engine combustion system at a location distal the fuel nozzle, such as at the primary or dilution orifices of the combustor. In one embodiment of the invention, the apparatus comprises a substantially hollow cylindrical tube adapted for insertion into a primary jet orifice of the combustor. A water nozzle is housed at the end of the tube opposite the primary jet orifice. The water nozzle is positionally adjustable relative to the inner liner. A pair of apertures is disposed along the tube between the primary jet orifice and the water nozzle so as to admit primary jet air from the plenum surrounding the combustion chamber into the tube. The apertures are configured to impart a swirling motion to the primary jet air as it enters the tube. Alternatively, at least one baffle may be housed within the tube proximal the aperture to impart a swirling motion to fluid communicated to the tube by the plenum. The water nozzle mixes water with the swirling air in the tube prior to the swirling air being admitted into the combustor through the primary air jet orifice. By pre-mixing the water with primary air, the need for complicated water/fuel injectors is obviated and the problems associated with injecting water proximal the fuel injector are eliminated.

16 Claims, 3 Drawing Sheets

METHOD AND APPARATUS FOR WATER INJECTION VIA PRIMARY JETS

REFERENCE TO COPENDING APPLICATION

This application claims the benefit of U.S. Provisional Application No. 60/057,362 filed Aug. 29, 1997.

FIELD OF THE INVENTION

The present invention relates generally to gas turbine engine combustors and more particularly to an apparatus and method for injecting fluid coolants into a gas turbine engine combustion chamber.

BACKGROUND OF THE INVENTION

In the design of gas turbine engines, it is important to not only construct a combustion system that performs efficiently, but also to construct one that minimizes undesirable emissions such as carbon monoxide (CO) and oxides of nitrogen (NOx) as well. A well-known method of minimizing such emissions involves injecting fluid coolants, such as water, into the combustion chamber in order to reduce the flame temperature therein.

In the known water injection systems, water is typically injected from a position immediately radially outwardly of the fuel source, i.e., atomized water is fed through the swirl vanes of the fuel injector tip. However, this method causes extreme thermogradients in the surrounding swirl cup, trumpet, dome plate, and other combustion chamber components as a result of the direct impingement of water droplets on the hot component parts. The resultant thermal stresses create cracks and greatly reduce the useful life of the components, necessitating increased maintenance, repair and inspection frequency.

A prior attempted solution to this problem involved constructing the affected components out of metal materials that are less prone to cracking and/or insulating the metals with thermal barrier ceramic coatings. While both of the above approaches have had some success in extending the useful lives of the components, cracking nonetheless occurs.

Another approach, described in U.S. Pat. No. 5,274,995, employs a combustor dome assembly having a swirler venturi and an auxiliary wall concentric with the swirler venturi to provide an annular passage for channeling a high velocity non-swirling annular air jet surrounding the swirl air injected by the swirler surrounding the fuel nozzle. This arrangement facilitates atomization of a film of water flowing along an inner surface of the venturi and out of the downstream end. However, among the problems associated with such an approach is the requirement of a relatively large prefilming surface located coaxially with and outboard of the fuel nozzles and the need for a complex injector capable of handling both fuel and water. Additionally, the approach disclosed in the '995 patent is similar to the myriad traditional approaches, in that the point of water introduction into the combustion chamber is proximal the swirl cup, trumpet, and dome plate thus perpetuating the likelihood that at least some water droplets will impact these components.

Additionally, it is often desirable to augment turbine engine thrust during take-offs and during various emergency conditions. Such thrust augmentation is often accomplished by introducing a fluid into the combustion chamber, thereby increasing the mass flow through the turbine inlet. As discussed above, fluid coolants such as water, whether injected for emissions reduction purposes or for thrust augmentation, are ideally introduced well downstream of sensitive fuel nozzle components. One approach to thrust augmentation, described in U.S. Pat. No. 2,847,825, involves injecting coolant into a combustion chamber through large holes disposed along a can-type combustion liner. Among the problems associated with the approach described in the '825 patent is that no provision is made therein to properly atomize the coolant prior to its introduction into the combustion chamber. Consequently, the approach described in the '825 patent is likely to cause water droplet impingement upon hot combustion chamber and/or turbine components and the creation of disproportionately cool regions with the chamber, thereby reducing engine efficiency.

Accordingly, a need exists for an improved apparatus and method for injecting fluid coolants into a gas turbine combustion system that minimizes damaging thermogradients in sensitive combustor components caused by coolant impingement thereupon.

SUMMARY OF THE INVENTION

In accordance with the present invention, an apparatus is disclosed for injecting fluid coolant into a gas turbine engine combustion system at a location distal the fuel nozzle, such as at the primary or dilution orifices of the combustor.

In one embodiment of the invention, the apparatus comprises a substantially hollow cylindrical tube adapted for insertion into a primary jet orifice of the combustor. A water nozzle is housed at the end of the tube opposite the primary jet orifice. The water nozzle is positionally adjustable relative to the inner liner. A pair of apertures is disposed along the tube between the primary jet orifice and the water nozzle so as to admit primary jet air from the plenum surrounding the combustion chamber into the tube. The apertures are configured to impart a swirling motion to the primary jet air as it enters the tube. Alternatively, at least one baffle may be housed within the tube proximal the aperture to impart a swirling motion to fluid communicated to the tube by the plenum. The water nozzle mixes water with the swirling air in the tube prior to the swirling air being admitted into the combustor through the primary air jet orifice. By pre-mixing the water with primary air, the need for complicated water/fuel injectors is obviated and the problems associated with injecting water proximal the fuel injector are eliminated.

DESCRIPTION OF THE PREFERRED EMBODIMENT

Figure 1:
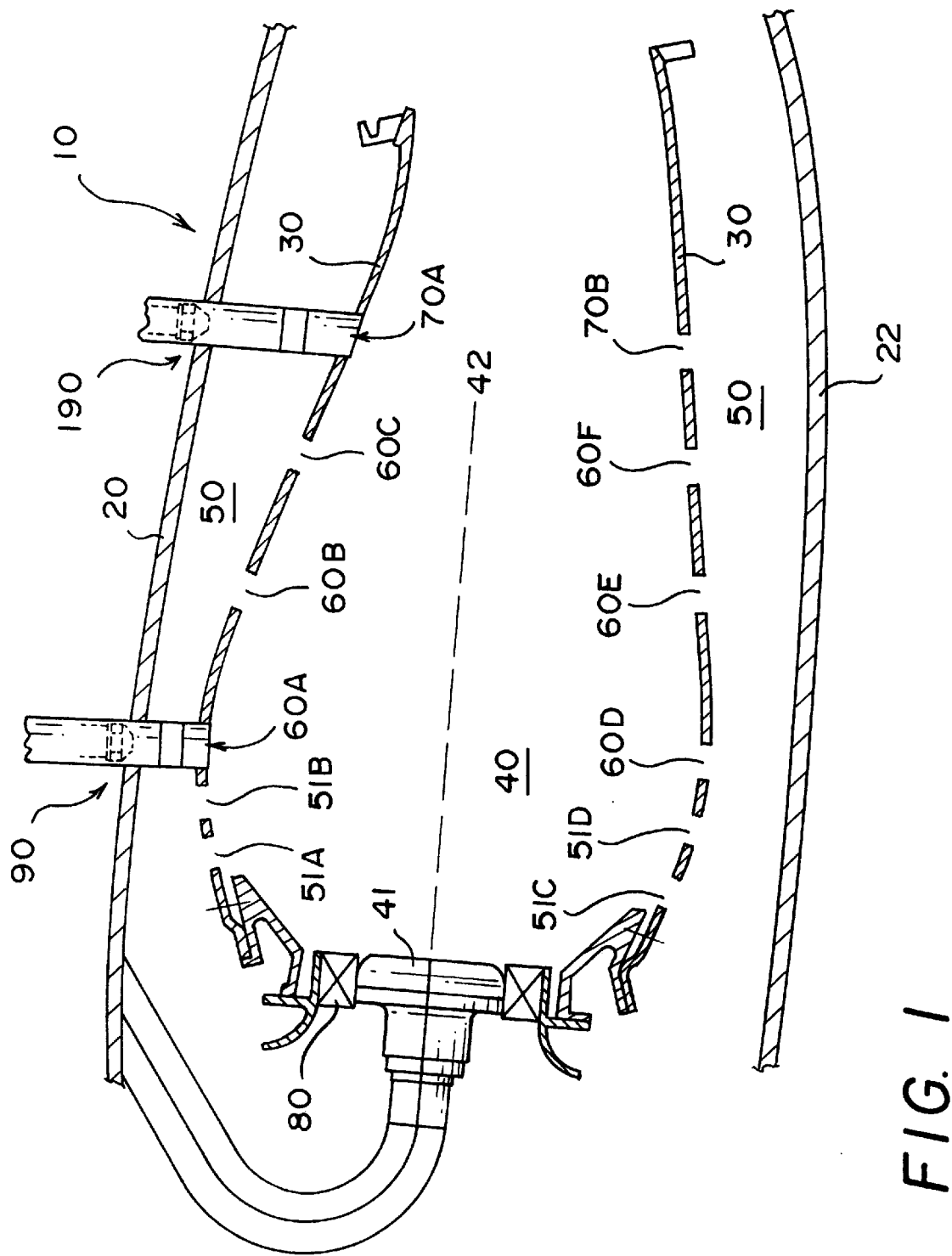
FIG. 1 is an upper half axi-symmetric cross-sectional view of an annular combustion chamber and a plurality of water injector apparatus incorporating features of the present invention.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows in half axi-symmetric cross-section a portion of a gas turbine engine annular combustion system 10. Combustion system 10 comprises an outer wall 20, an inner wall 22 and a combustor liner 30 enclosing a combustion chamber 40. Walls 20 and 22 in cooperation with liner 30 define a plenum 50 therebetween. Fuel is introduced into the combustion chamber 40 by a pressurized fuel nozzle 41. Compressed air flowing through plenum 50 normally enters combustion chamber 40 through a series of mixing orifices 51A, 51, 51C and 51D, primary jet orifices 60A, 60B, 60C, 60D, 60E and 60F and dilution orifices 70A and 70B disposed along liner 30. Air entering combustion chamber 40 through mixing orifices 51A, 51B, 51C and 51D mixes rapidly with the fuel to form a combustible mixture and prevents flame blowout by forming a low-velocity stabilization zone that acts as a continuous pilot for fuel burning. This mixing function may be augmented by air entering combustion chamber 40 through a swirling apparatus 80 surrounding fuel nozzle 41. Air entering combustion chamber 40 through primary jet orifices 60A, 60B, 60C, 60D, 60E and 60F, referred to herein as primary air, forms a primary combustion zone, provides the correct mixture for combustion and creates turbulence sufficient for transferring energy from burned gases to unburned gases. Air entering combustion chamber 40 through dilution orifices 70A and 70B functions to cool hot combustion gases prior to their entry into the turbine inlet (not shown).

As will be more fully discussed hereinafter, an injection apparatus 90 for injecting fluid coolant such as water into combustion chamber 40 to reduce NOx emissions is inserted into primary jet orifice 60A. Additionally, an injection apparatus 190 for injecting water into combustion chamber 40 to augment engine power by increasing the mass flow rate through the turbine may be inserted into dilution orifice 70A. Only one injection apparatus for cooling purposes and/or one injection apparatus for thrust augmentation purposes need be employed for each fuel nozzle incorporated by the combustion system irrespective of the number of primary air jets or dilution orifices. The term "thrust augmentation" as used herein includes power augmentation for non-propulsive applications.

Figure 2:
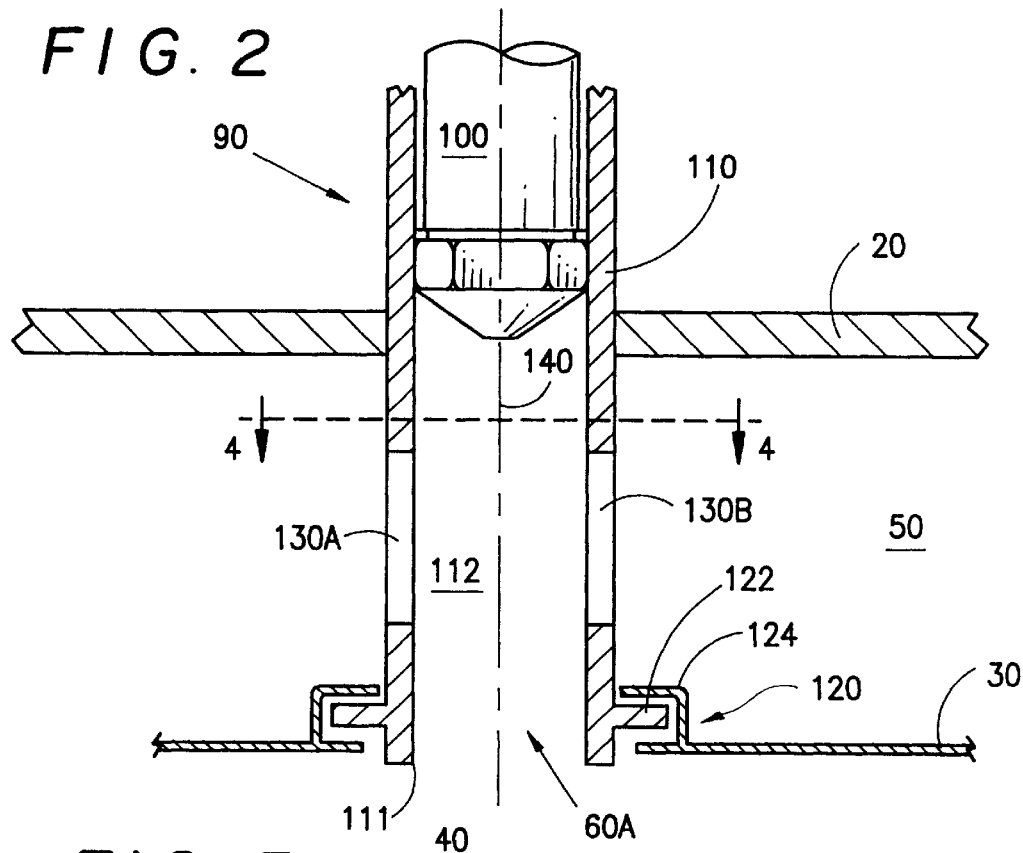
FIG. 2 is an enlarged cross-sectional view of the water injector apparatus according to the present invention disposed within a primary jet orifice as shown in FIG. 1.

As shown in FIG. 2, water injection apparatus 90 incorporates a fluid coolant nozzle 100 such as a Delavan® WGF 154 simplex type nozzle for producing a conical water spray. Nozzle 100 is housed inside a substantially cylindrical hollow tube 110. One portion of tube 110 penetrates and is welded or otherwise attached by conventional means to outer wall 20. Tube 110 is further attached at its open end 111 to liner 30 via a floating seal 120. Seal 120 comprises a rigid flange 122 attached to tube 110 and a crimping flange 124 attached to liner 30 which cooperate to retain tube 110 while forming a labyrinth seal between tube 110 and liner 30. Seal 120 floats in order to allow radial and axial thermal expansion and contraction of liner 30 relative to outer wall 20. Tube 110 is provided with one or more orifices 130A and 130B that provide fluid communication between plenum 50 and the interior 112 of tube 110.

High temperature primary air flowing through plenum 50 that would otherwise enter combustion chamber 40 directly through primary jet orifice 60A is instead directed through apertures 130A and 130B into tube 110. Once inside tube 110, the primary air mixes with and evaporates water injected by nozzle 100, thereby producing a water/air jet entering combustion chamber 40 through primary jet orifice 60A in order to reduce the flame temperature in the primary combustion zone, that reduces NOx.

Figure 3:
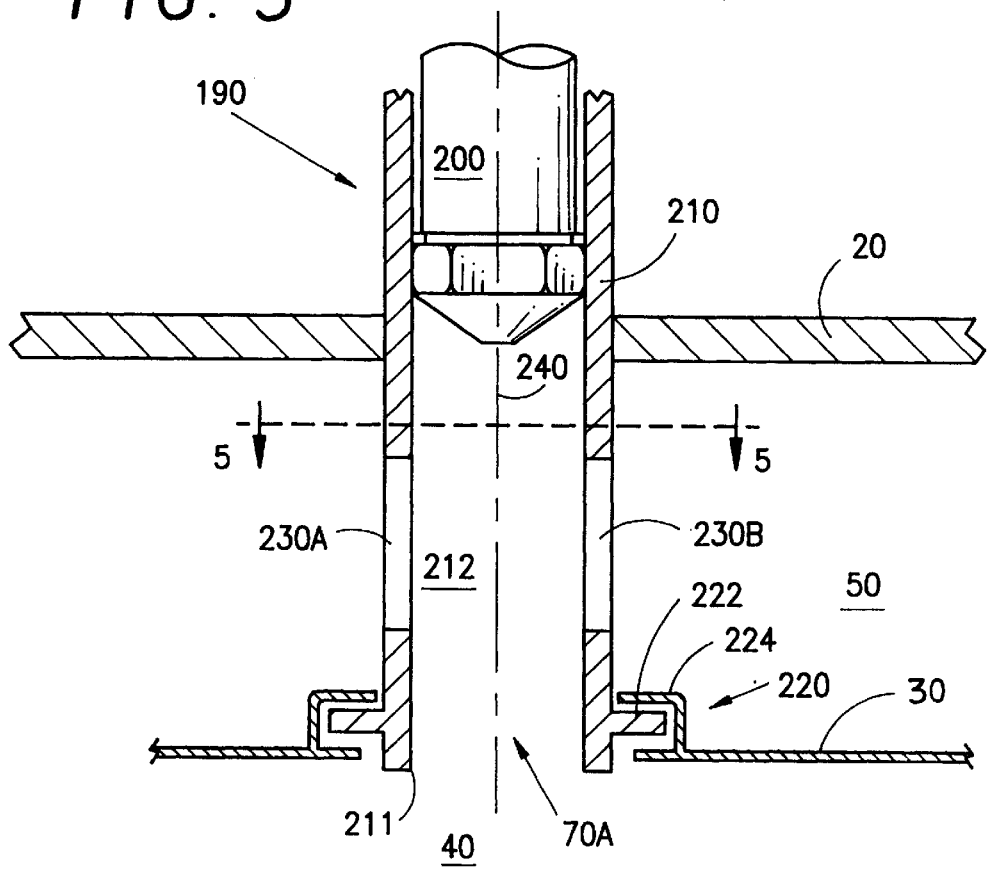
FIG. 3 is an enlarged cross-sectional view of the water injector apparatus according to the present invention disposed within a dilution orifice as shown in FIG. 1.

As shown in FIG. 3, water injection apparatus 190, intended for thrust augmentation, incorporates a fluid coolant nozzle 200 similar to nozzle 100 used in water injection apparatus 90. Nozzle 200 is housed inside a substantially cylindrical hollow tube 210. One portion of tube 210 penetrates and is welded or otherwise attached by conventional means to outer wall 20 in fluid communication with dilution orifice 70A. Tube 210 is further attached at its open end 211 to liner 30 via a floating seal 220. Seal 220 comprises a rigid flange 222 attached to tube 210 and a crimping flange 224 attached to liner 30 which cooperate to retain tube 210 while forming a labyrinth seal between tube 210 and liner 30. Seal 220 floats in order to allow radial and axial thermal expansion and contraction of liner 30 relative to outer wall 20. Tube 210 is provided with one or more orifices 230A and 230B that provide fluid communication between plenum 50 and the interior 212 of tube 210.

High temperature primary air flowing through plenum 50 that would otherwise enter combustion chamber 40 directly through dilution orifice 70A is instead directed through apertures 230A and 230B into tube 210. Once inside tube 210, the primary air mixes with and evaporates water injected by nozzle 200, thereby producing a water/air jet entering combustion chamber 40 through dilution orifice 70A in order to augment engine power by increasing mass flow rate through the turbine.

Figure 4:
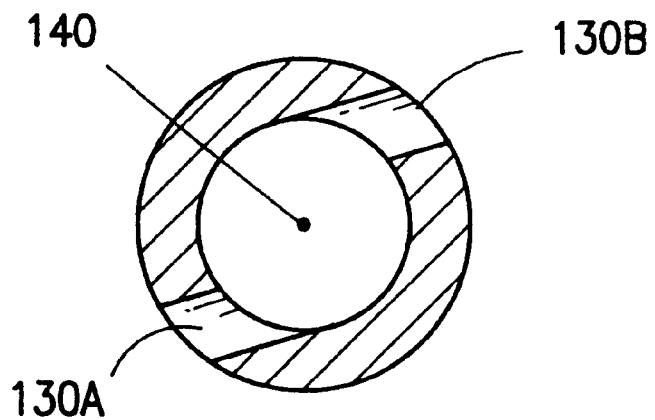
FIG. 4 is a cross-sectional view of a mixing tube according to the present invention taken along line 4—4 of FIG. 2

As shown in FIG. 4, apertures 130A and 130B of tube 110 are disposed tangentially with respect to the mixing tube longitudinal axis 140 and, accordingly, impart a tangential velocity component to the primary air entering tube 110 relative to the longitudinal axis 140 of tube 110. This tangential velocity component enhances water and primary air mixing within tube 110, increases residence time of the water in tube 110 thereby promoting more complete water evaporation and cooling of the primary air, and enables atomization of water that may film along the interior surface of tube 110. The tangential velocity component further ensures that any water entering combustion chamber 40 is forcefully dispersed therein. Depending on the needs of the particular application, the length of tube 110 may be adjusted as well as the position of nozzle 100 within tube 110 so as to permit nozzle 100 to be radially repositioned within tube 110 with respect to combustion chamber longitudinal axis 42. This positional adjustability enables control over the levels of evaporated and unevaporated coolant entering combustion chamber 40.

Figure 5:
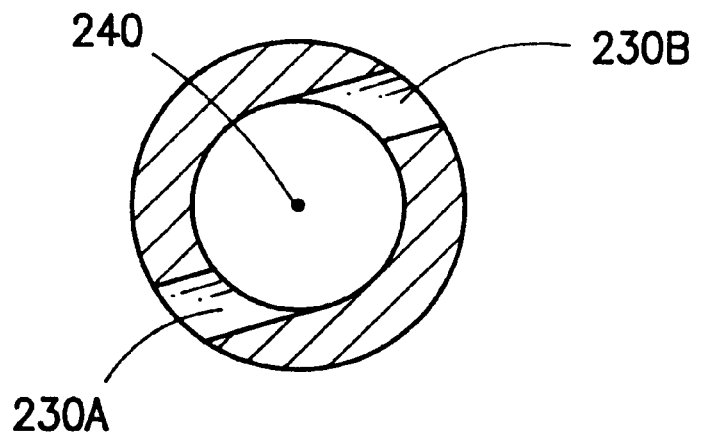
FIG. 5 is a cross-sectional view of a mixing tube according to the present invention taken along line 5—5 of FIG. 3.

Similarly, as shown in FIG. 5, apertures 230A and 230B of tube 210 are disposed tangentially with respect to the mixing tube longitudinal axis 240 and, accordingly, impart a tangential velocity component to the primary air entering tube 210 relative to the longitudinal axis 240 of tube 210. This tangential velocity component enhances water and primary air mixing within tube 210, increases residence time of the water in tube 210 thereby promoting more complete water evaporation and cooling of the primary air, and enables atomization of water that may film along the interior surface of tube 210. The tangential velocity component further ensures that any water entering combustion chamber 40 is forcefully dispersed therein. Depending on the needs of the particular application, the length of tube 210 may be adjusted as well as the position of nozzle 200 within tube 210 so as to permit nozzle 200 to be radially repositioned within tube 210 with respect to combustion chamber longitudinal axis 42. This positional adjustability enables control over the levels of evaporated and unevaporated coolant entering combustion chamber 40. While the illustrative embodiments shown in FIGS. 2, 3, 4 and 5 each employ two apertures 130A, 130B and 230A, 230B, it is to be understood that fewer or more than two apertures may be employed with no resulting functional loss. Other methods of inducing a tangential component to the primary air such as tabs formed in the side of a thin walled tube 110, 210 or swirler vanes within tube 110, 210 are also possible, all within the scope of the invention.

Although the invention has been described in terms of the illustrative embodiment, it will be appreciated by those skilled in the art that various changes and modifications may be made to the illustrative embodiment without departing from the spirit or scope of the invention. For example, apparatus 90 may operate in conjunction with any of primary jet orifices 60A, 60B, 60C, 60D, 60E and 60F that function solely to supply air to combustion chamber 40 in order to form or maintain the primary combustion zone. It is to be further understood that apparatus 190 may operate in conjunction with dilution orifices 70A and 70B that function solely to supply air to combustion chamber 40 in order to cool hot combustion gases prior to their entry into the turbine inlet. Additionally, while the preferred embodiment is described herein as employed by an annular combustion system, it is to be understood that the preferred embodiment may be employed by any combustion system that utilizes air supplied through a combustion liner for the purpose of forming or maintaining a primary combustion zone within a combustion chamber. It is intended that the scope of the invention not be limited in any way to the illustrative embodiment shown and described but that the invention be limited only by the claims appended hereto.

What is claimed is:

1. An apparatus for injecting fluid coolant into a gas turbine engine combustor, the combustor having a combustion chamber defined by a combustor liner and a pressurized air plenum circumscribing the combustor liner, the combustor liner having at least one primary air orifice extending therethrough, said apparatus comprising:

a hollow tube adapted for insertion into the primary air orifice, said tube extending from a first open end in fluid communication with the combustion chamber through the primary air orifice to a second open end, the tube further comprising a side wall defining a longitudinal axis of the tube, the wall having at least one aperture disposed therein, said aperture in fluid communication between said air plenum and the interior of the tube; and a fluid nozzle disposed through said second end of the tube, said fluid nozzle adapted to inject a flow of liquid coolant into an air stream flowing from said aperture to the first open end of the tube and then to the combustion chamber.

2. An apparatus in accordance with claim 1 further comprising:

means for imparting a tangential component to said air stream relative to said tube longitudinal axis.

3. An apparatus in accordance with claim 1, wherein:

said aperture comprises an opening having a wall defining a longitudinal axis of said aperture, said aperture longitudinal axis disposed in a non-intersecting relationship with said tube longitudinal axis for providing a tangential component to said air stream relative to said tube longitudinal axis.

4. An apparatus in accordance with claim 1, wherein:

said aperture comprises an opening having a baffle for imparting a tangential component to said air stream relative to said tube longitudinal axis.

5. An apparatus in accordance with claim 1, wherein:

said pressurized air plenum comprises a chamber, said chamber comprising an outer plenum wall disposed externally to said combustor liner and wherein said tube passes through and sealingly engages said outer plenum wall.

6. An apparatus in accordance with claim 1, wherein:

said fluid nozzle is positionally adjustable within said tube relative the combustor liner.

7. An apparatus in accordance with claim 1 comprising:

a floating seal attaching the combustor liner to said tube proximal said first open end.

8. An apparatus for injecting fluid coolant into a gas turbine engine combustor, the combustor having a combustion chamber defined by a combustor liner and having a pressurized air plenum circumscribing the combustor liner, the pressurized air plenum defined by an outer plenum wall spaced apart from said combustor liner, the combustor liner having at least one primary air orifice disposed therethrough, said apparatus comprising:

a hollow tube adapted for insertion into the primary air orifice, said tube passing through and sealingly engaging said outer plenum wall, said tube comprising a first open end in fluid communication with the combustion chamber through the primary air orifice, said tube further comprising a side wall defining a longitudinal axis of said tube, said wall having at least one aperture disposed therein, said aperture providing fluid communication between said pressurized air plenum and the interior of said tube, said aperture comprising an opening having a wall defining a longitudinal axis of said aperture, said aperture longitudinal axis disposed in a non-intersecting relationship with said tube longitudinal axis for providing a tangential component to said air stream relative to said tube longitudinal axis, said tube having a second open end;

a fluid nozzle disposed through said second end of said tube, said fluid nozzle adapted to inject a flow of liquid coolant into an air stream flowing from said aperture to the first open end of the tube, said fluid nozzle being positionally adjustable within said tube relative the combustor liner; and a floating seal attaching the combustor liner to said tube proximal said first open end.

9. An apparatus for injecting fluid coolant into a gas turbine engine combustor for providing thrust augmentation, the combustor having a combustion chamber defined by a combustor liner and a pressurized air plenum circumscribing the combustor liner, the combustor liner having at least one dilution orifice disposed therethrough, said apparatus comprising: a hollow tube adapted for insertion into the dilution orifice, said tube comprising a first open end in fluid communication with the combustion chamber through the dilution orifice, said tube further comprising a side wall defining a longitudinal axis of said tube, said wall having at least one aperture disposed therein, said aperture providing fluid communication between said air plenum and the interior of the tube, said tube having a second open end; and a fluid nozzle disposed through said second open end of said tube, said fluid nozzle adapted to inject a flow of liquid coolant into an air stream flowing from said aperture to the first open end of said tube.

10. An apparatus in accordance with claim 9 further comprising:
   means for imparting a tangential component to said air stream relative to said tube longitudinal axis.

11. An apparatus in accordance with claim 9 wherein:
   said aperture comprises an opening having a wall defining a longitudinal axis of said aperture, said aperture longitudinal axis disposed in a non-intersecting relationship with said tube longitudinal axis for providing a tangential component to said air stream relative to said tube longitudinal axis.

12. An apparatus in accordance with claim 9, wherein:
   said aperture comprises an opening having a baffle for imparting a tangential component to said air stream relative to said tube longitudinal axis.

13. An apparatus in accordance with claim 9, wherein:
   said pressurized air plenum comprises a chamber, said chamber comprising an outer plenum wall disposed externally to said combustor liner and wherein said tube passes through and sealingly engages said outer plenum wall.

14. An apparatus in accordance with claim 9, wherein:
   said fluid nozzle is positionally adjustable within said tube relative the combustor liner.

15. An apparatus in accordance with claim 9, comprising:
   a floating seal attaching the combustor liner to said tube proximal said first open end.

16. An apparatus for injecting fluid coolant into a gas turbine engine combustor, the combustor having a combustion chamber having a combustor liner and a pressurized air plenum circumscribing the combustor liner, the pressurized air plenum comprising a chamber, said chamber comprising an outer plenum wall disposed externally to said combustor liner, the combustor liner having at least one dilution orifice disposed therethrough, said apparatus comprising:
   a hollow tube adapted for insertion into the dilution orifice, said tube passing through and sealingly engaging said outer plenum wall, said tube comprising a first open end in fluid communication with the combustion chamber through the dilution orifice, said tube further comprising a side wall defining a longitudinal axis of said tube, said wall having at least one aperture disposed therein, said aperture providing fluid communication between said air plenum and the interior of the tube, said aperture comprising an opening having a wall defining a longitudinal axis of said aperture, said aperture longitudinal axis disposed in a non-intersecting relationship with said tube longitudinal axis for providing a tangential component to said air stream relative to said tube longitudinal axis, said tube having a second open end;
   a fluid nozzle disposed through the second open end of said tube, said fluid nozzle adapted to inject a flow of liquid coolant into an air stream flowing from said aperture to the first open end of the tube, said fluid nozzle being positionally adjustable within the tube relative the combustor liner; and
   a floating seal attaching the combustor liner to said tube proximal said first open end.

* * * * *